US012217711B2

(12) United States Patent
Zhou et al.

(10) Patent No.: US 12,217,711 B2
(45) Date of Patent: Feb. 4, 2025

(54) ELECTROPHORETIC DISPLAY DEVICE AND METHOD FOR ELECTROPHORETIC DISPLAY REFRESHING

(71) Applicant: HKC Corporation Limited, Guangdong (CN)

(72) Inventors: Mancheng Zhou, Guangdong (CN); Haoxuan Zheng, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/090,089

(22) Filed: Dec. 28, 2022

(65) Prior Publication Data

US 2023/0290315 A1 Sep. 14, 2023

(30) Foreign Application Priority Data

Mar. 10, 2022 (CN) ......................... 202210238195.8

(51) Int. Cl.
*G09G 3/34* (2006.01)
*G09G 3/20* (2006.01)

(52) U.S. Cl.
CPC ........... *G09G 3/344* (2013.01); *G09G 3/2096* (2013.01); *G09G 3/3433* (2013.01); (Continued)

(58) Field of Classification Search
CPC .... G09G 3/344; G09G 3/3433; G09G 3/2096; G09G 2310/0243; G09G 2310/0245; (Continued)

(56) References Cited

U.S. PATENT DOCUMENTS

| | | | | |
|---|---|---|---|---|
| 11,114,048 | B1 * | 9/2021 | Huang | G09G 3/344 |
| 2003/0137521 | A1 | 7/2003 | Zehner et al. | |

(Continued)

FOREIGN PATENT DOCUMENTS

| | | | |
|---|---|---|---|
| CN | 101206371 | A | 6/2008 |
| CN | 101325036 | A | 12/2008 |

(Continued)

OTHER PUBLICATIONS

Translation of First Office Action issued in corresponding CN Application No. CN202210238195.8, mailed Sep. 1, 2022, pp. 1-10.

*Primary Examiner* — William Boddie
*Assistant Examiner* — Saifeldin E Elnafia
(74) *Attorney, Agent, or Firm* — Scully, Scott, Murphy & Presser, P.C.

(57) ABSTRACT

An electrophoretic display device and a method for electrophoretic display refreshing are provided in the disclosure. The electrophoretic display device includes a display screen, a driving circuit, a driving control circuit, and a processor. The display screen includes multiple pixel units. The driving circuit is configured to generate multiple first data-voltage signals at a first time and multiple second data-voltage signals at a second time. The processor is configured to obtain and compare one of the multiple first data-voltage signals and one of the multiple second data-voltage signals that both are to be received by a same pixel unit of the multiple pixel units, to obtain a comparison result, and the processor is configured to control, according to the comparison result, the driving circuit and the driving control circuit to drive the pixel unit to work.

12 Claims, 3 Drawing Sheets

(52) U.S. Cl.
CPC ............... *G09G 2310/0243* (2013.01); *G09G 2310/0245* (2013.01); *G09G 2320/0257* (2013.01); *G09G 2330/021* (2013.01); *G09G 2330/022* (2013.01)

(58) Field of Classification Search
CPC ..... G09G 2320/0257; G09G 2330/021; G09G 2330/022
See application file for complete search history.

(56) References Cited

U.S. PATENT DOCUMENTS

| | | | | |
|---|---|---|---|---|
| 2008/0143700 | A1* | 6/2008 | Shin | G09G 3/344<br>345/208 |
| 2010/0149158 | A1* | 6/2010 | Lee | G09G 3/344<br>345/214 |
| 2012/0062547 | A1 | 3/2012 | Yamada | |
| 2017/0092198 | A1* | 3/2017 | Ryu | G09G 3/3275 |

FOREIGN PATENT DOCUMENTS

| | | | |
|---|---|---|---|
| CN | 101751867 | A | 6/2010 |
| CN | 102543000 | A | 7/2012 |
| CN | 106409200 | A | 2/2017 |
| CN | 106898316 | A | 6/2017 |

* cited by examiner

| | ROW 1 | ROW 2 | ... | | | | ROW N-1 | ROW N |
|---|---|---|---|---|---|---|---|---|
| COLUMN 1 | 1 | 1 | 0 | 0 | 0 | 1 | 0 | 1 |
| COLUMN 2 | 0 | 2 | 1 | 0 | 0 | 0 | 0 | 0 |
| . | 1 | 0 | ... | | | | 1 | 2 |
| . | 0 | 2 | | | | | 0 | 0 |
| . | 2 | 0 | | | | | 0 | 1 |
| | 1 | 0 | | | | | 2 | 0 |
| | 0 | 1 | | | | | 1 | 0 |
| | 0 | 2 | | | | | 0 | 1 |
| | 1 | 0 | | | | | 0 | 2 |
| COLUMN 10 | 0 | 0 | 0 | 0 | 1 | 0 | 2 | 0 |
| COLUMN 11 | 0 | 0 | 0 | 1 | 0 | 0 | 0 | 1 |

ELECTROPHORETIC DISPLAY DEVICE AND METHOD FOR ELECTROPHORETIC DISPLAY REFRESHING

CROSS-REFERENCE TO RELATED APPLICATIONS

This application claims priority under 35 U.S.C. § 119(a) to Chinese Patent Application No. 2022102381958, filed Mar. 10, 2022, the entire disclosure of which is incorporated herein by reference.

TECHNICAL FIELD

This application relates to the field of electrophoretic display technology, and more particularly to an electrophoretic display device and a method for electrophoretic display refreshing.

BACKGROUND

Electrophoretic display technology is regarded as one of important research directions in the field of display technology. Invention of electronic ink greatly promotes development of electrophoretic display technology, and the electronic ink is usually made into thin films for electronic display screens, especially for electronic books.

By applying a voltage to electronic ink corresponding to each pixel, the corresponding pixel can display different gray levels according to the voltage. However, on condition that a current voltage that is applied to electronic ink corresponding to a pixel and a next voltage that is applied to the electronic ink corresponding to the pixel have a same polarity and different values, the pixel driven by a circuit will display an inaccurate gray level, causing occurrence of image sticking during displaying.

SUMMARY

In a first aspect, an electrophoretic display device is provided in the disclosure. The electrophoretic display device includes a display screen, a driving circuit, a driving control circuit, and a processor. The display screen includes multiple pixel units. The driving circuit is configured to generate multiple first data-voltage signals at a first time and multiple second data-voltage signals at a second time. The processor is configured to obtain and compare one of the multiple first data-voltage signals and one of the multiple second data-voltage signals that both are to be received by a same pixel unit of the multiple pixel units, to obtain a comparison result, and the processor is configured to control, according to the comparison result, the driving circuit and the driving control circuit to drive the pixel unit to work.

In a second aspect, a method for electrophoretic display refreshing is further provided in the disclosure. The method for electrophoretic display refreshing is applied to the electrophoretic display device illustrated in the first aspect. The method for electrophoretic display refreshing includes the following. Multiple first data-voltage signals generated by the driving circuit are obtained at a first time, and multiple second data-voltage signals generated by the driving circuit are obtained at a second time. One of the multiple first data-voltage signals and one of the multiple second data-voltage signals that both are to be received by a same pixel unit of the multiple pixel units are compared, to obtain a comparison result. The driving circuit and the driving control circuit are controlled, according to the comparison result, to drive the pixel unit to work.

BRIEF DESCRIPTION OF THE DRAWINGS

To illustrate technical solutions of implementations of the disclosure more clearly, the following will give a brief introduction to accompanying drawings used for illustrating implementations. Apparently, the accompanying drawings hereinafter illustrated are some implementations of the disclosure. Based on these drawings, those of ordinary skill in the art can also obtain other drawings without creative effort.

Description of reference signs of the accompanying drawings: electrophoretic display device—1, display screen—11, pixel unit—111, driving circuit—12, driving control circuit—14, first transistor—141, second transistor—142, time-sequence controller—143, output end—121, input end—122, processor—13, grid electrode—g, first electrode—d, second electrode—s.

DETAILED DESCRIPTION

The following will illustrate clearly and completely technical solutions of implementations of the disclosure with reference to accompanying drawings of implementations of the disclosure. Apparently, implementations illustrated herein are merely some implementations, rather than all implementations, of the disclosure. Based on the implementations of the disclosure, all other implementations obtained by those of ordinary skill in the art without creative effort shall fall within the protection scope of the disclosure.

Figure 1:
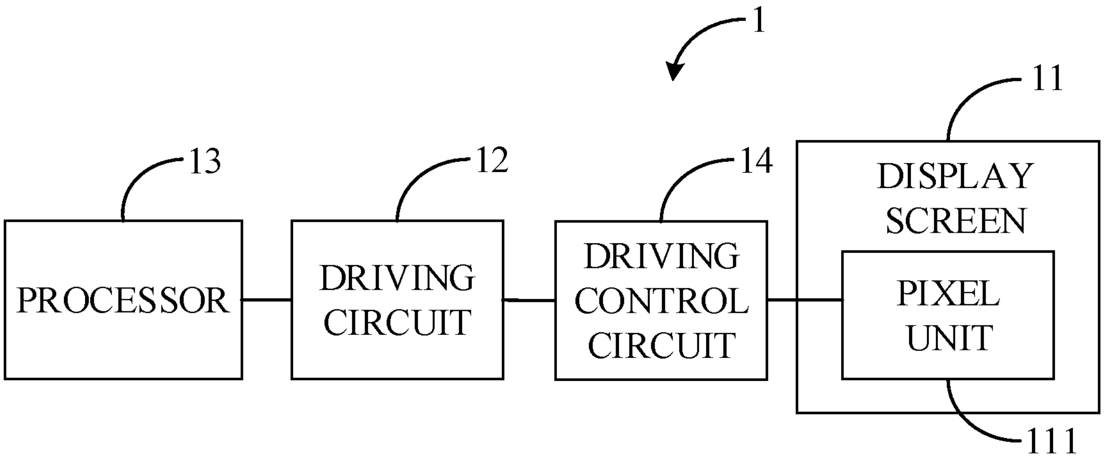
FIG. 1 is a schematic frame diagram illustrating an electrophoretic display device provided in an implementation of the disclosure.

An electrophoretic display device 1 is provided in the disclosure. Referring to FIG. 1, FIG. 1 is a schematic frame diagram illustrating an electrophoretic display device provided in an implementation of the disclosure. The electrophoretic display device 1 includes a display screen 11, a driving circuit 12, a processor 13, and a driving control circuit 14. The display screen 11 includes multiple pixel units 111. The driving circuit 12 is configured to generate multiple first data-voltage signals at a first time and multiple second data-voltage signals at a second time. The processor 13 is configured to obtain and compare one of the multiple first data-voltage signals and one of the multiple second data-voltage signals that both are to be received by a same pixel unit 111 of the multiple pixel units, to obtain a comparison result, and the processor 13 is configured to control, according to the comparison result, the driving circuit 12 and the driving control circuit 14 to drive the pixel unit 111 to work.

Reference of specific circuit designs of the driving circuit 12 can be made to driving circuit for diving pixel units in the art, which will not be described herein. Specifically, the disclosure will take the electrophoretic display device 1 as an example for brief illustration of electrophoretic display technology. Electronic ink is disposed at a location corresponding to the pixel unit 111, and the electronic ink has liquid charges. Generally, the electronic ink has a positive charge dyed white and a negative charge dyed black. If a positive voltage or a negative voltage is applied to the pixel unit 111, under an electric field, liquids with charges are individually attracted or repelled, thereby realizing that the pixel unit 111 displays white or black. Meanwhile, the voltage applied to the pixel unit 111 can also charge an energy storage capacitor corresponding to the pixel unit 111, such that a certain voltage across two ends of the pixel unit 111 is maintained, thereby realizing continuous display of images.

Figure 2:
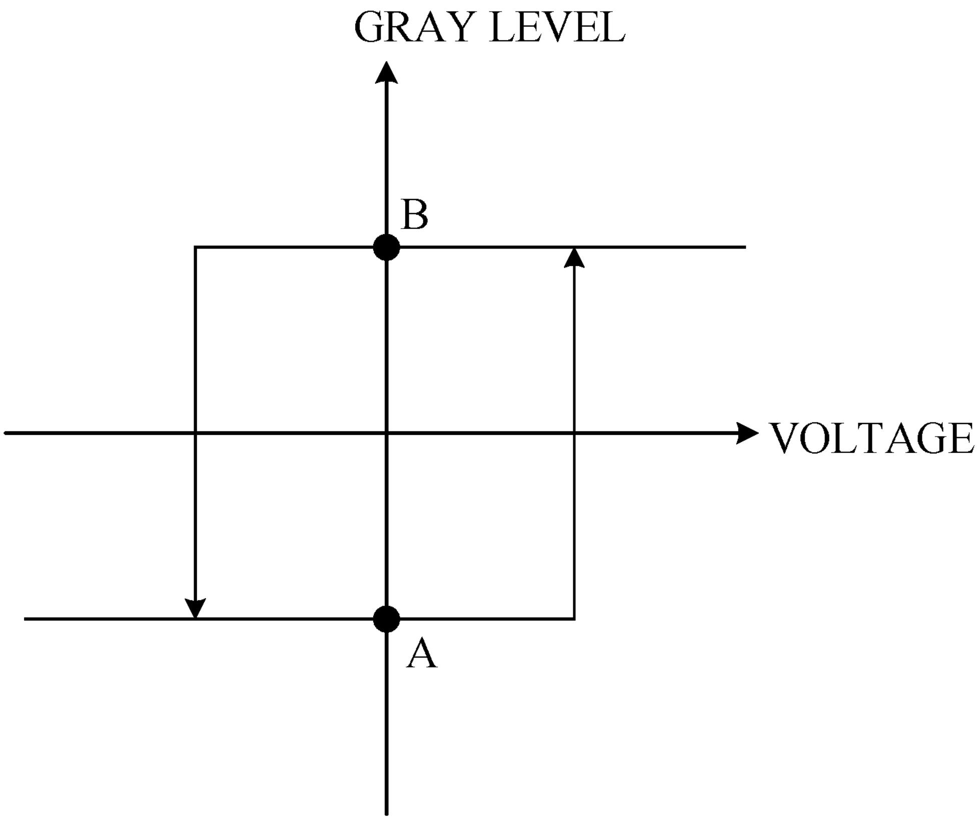
FIG. 2 is a schematic diagram illustrating a possible relation between gray levels and voltages provided in the disclosure.

It is to be noted that, referring to FIG. 2 together, FIG. 2 is a schematic diagram illustrating a possible relation between gray levels and voltages provided in the disclosure. As illustrated in FIG. 2, an ordinate represents a gray level displayed by the pixel unit 111, and an abscissa represent a voltage of a data-voltage signal that is received by the pixel unit 111. For example, supposing that a voltage of a data-voltage signal that is received by the pixel unit 111 increases from 0 Volt (V) and then decreases to 0 V, a gray level displayed by the pixel unit 111 may be moved from point A to point B according to a path direction. If the pixel unit 111 is still required to display white at next refresh, the gray level displayed by the pixel unit 111 cannot be moved according to a path direction illustrated in FIG. 2 when being moved from point B. In other words, a voltage of a data-voltage signal that is generated by the driving circuit 12 is different from a voltage of a data-voltage signal that is required by the pixel unit 111 to display a corresponding gray level, such that a gray level actually displayed by the pixel unit 111 is different from a gray level required to be displayed by the pixel unit 111, thereby causing occurrence of image sticking in displaying images.

In the implementation, the first time is adjacent to the second time. Comparing the first data-voltage signal and the second data-voltage signal refers to compare the first data-voltage signal received by each of the multiple pixel units 111 when a previous frame of images is displayed and the second data-voltage signal received by the pixel unit 111 when a current frame of images is displayed and determine whether the first data-voltage signal and the second data-voltage signal are the same, and then the processor 13 controls, according to the comparison result, the driving circuit 12 and the driving control circuit 14 to generate a corresponding data-voltage signal, such that a gray level actually displayed by the pixel unit 111 is the same as a gray level required to be displayed by the pixel unit 111.

It can be understood that, in the implementation, by obtaining the comparison result through comparing the first data-voltage signal and the second data-voltage signal that both are to be received by the same pixel unit 111 at different times, the processor 13 controls, according to the comparison result, the driving circuit 12 and the driving control circuit 14 to drive the pixel unit 111 to work, thereby realizing partial refresh instead of full-screen refresh, and thus reducing a risk of occurrence of image sticking and reducing power consumption of driving the pixel unit 111.

It is to be noted that, in the implementation, the processor 13 directly obtains and compares the first data-voltage signal and the second data-voltage signal that both are to be received by each of the multiple pixel units 111. It can be understood that, relative to comparing differences between the previous frame of images and the current frame of images and then controlling the driving circuit 12 to drive a corresponding pixel unit 111, the processor 13 in the implementation can dramatically control the driving circuit 12 and the driving control circuit 14, such that power consumption is lower and efficiency is higher.

In a possible implementation, on condition that the comparison result represents that the first data-voltage signal and the second data-voltage signal that both are to be received by the same pixel unit 111 are the same, the processor 13 controls the driving circuit 12 and the driving control circuit 14 to generate a third data-voltage signal for charging the pixel unit 111, where a voltage of each of the first data-voltage signal and the second data-voltage signal is greater than or less than a voltage of the third data-voltage signal, and the voltage of the third data-voltage signal is 0 V.

Specifically, the first data-voltage signal and the second data-voltage signal that both are to be received by the same pixel unit 111 being the same refers to that the first data-voltage signal and the second data-voltage signal have the same polarity and the same value. That is to say, a gray level displayed by the pixel unit 111 at the first time is the same as a gray level displayed by the pixel unit 111 at the second time.

It can be understood that, at the second time, the first data-voltage signal has charged the energy storage capacitor corresponding to the pixel unit 111, such that the pixel unit 111 can maintain at the second time the gray level displayed at the first time. Therefore, the processor 13 controls the driving circuit 12 and the driving control circuit 14 to generate the third data-voltage signal for charging the pixel unit 111, and the voltage of the third data-voltage signal is 0 V, such that the third data-voltage signal does not change the gray level displayed by the pixel unit 111.

It can be understood that, in the implementation, on condition that the comparison result represents that the first data-voltage signal and the second data-voltage signal that both are to be received by the same pixel unit 111 are the same, the processor 13 controls the driving circuit 12 and the driving control circuit 14 to generate the third data-voltage signal for charging the pixel unit 111, thereby realizing partially refreshing the pixel unit 111.

Figures 3, 4:
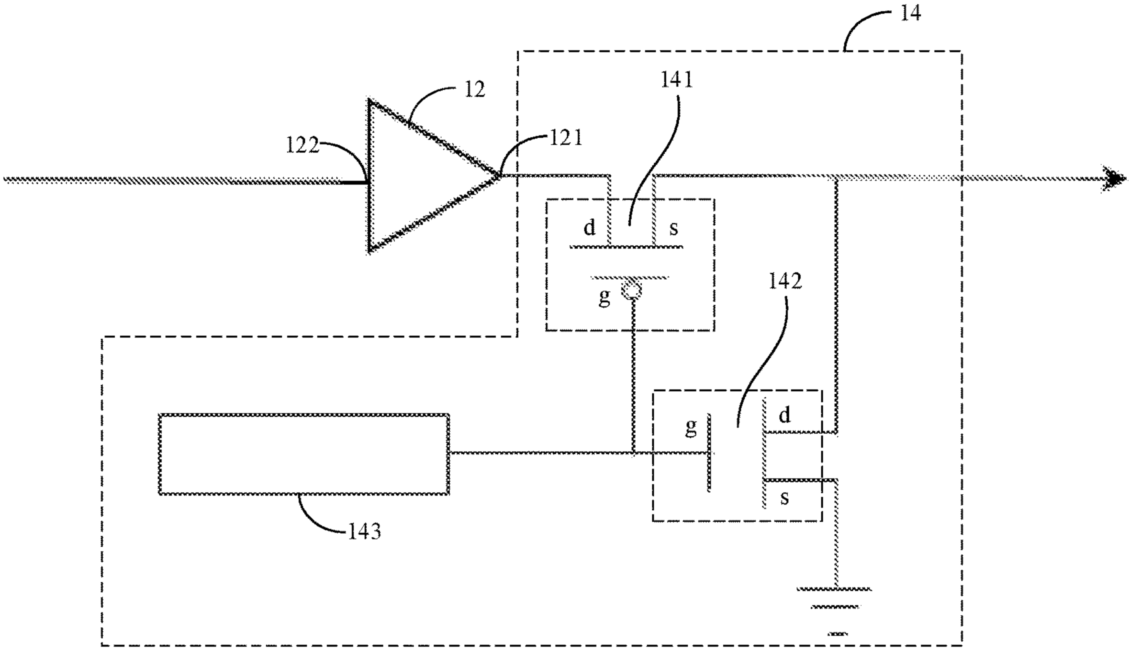
FIG. 3 is a schematic diagram illustrating a driving circuit and a driving control circuit provided in an implementation of the disclosure.
FIG. 4 is a data-voltage-signal Look-Up Table (LUT) provided in an implementation of the disclosure.

In a possible implementation, referring to FIG. 3 together, FIG. 3 is a schematic diagram illustrating a driving circuit 12 and a driving control circuit 14 provided in an implementation of the disclosure. The driving control circuit 14 includes a first transistor 141, a second transistor 142, and a time-sequence controller 143. A first electrode d of the first transistor 141 is electronically coupled with an output end 121 of the driving circuit 12, and a second electrode s of the first transistor 141 is electronically coupled with a first electrode d of the second transistor 142. A grid electrode g of the first transistor 141 is electronically coupled with a grid electrode g of the second transistor 142 and is configured to receive a time-sequence signal generated by the time-sequence controller 143. A second electrode s of the second transistor 142 is configured to receive a ground signal. The first transistor 141 and the second transistor 142 are complementary transistors.

Specifically, the processor 13 is electronically coupled with an input end 122 of the driving circuit 12, where the input end 122 is configured to receive a control electrical signal transmitted by the processor 13, the driving circuit 12 generates a corresponding data-voltage signal according to the control electrical signal, and the corresponding data-voltage signal is outputted via the output end 121. On condition that the first transistor 141 is turned on under control of the time-sequence signal generated by the time-sequence controller 143, the output end 121 of the driving circuit 12 is configured to output the data-voltage signal generated by the driving circuit 12, and the data-voltage signal is outputted to the pixel unit 111 via a channel formed by the first electrode d of the first transistor 141 and the second electrode s of the first transistor 141.

It is to be noted that, under loading of the time-sequence signal, the grid electrode g of the first transistor 141 or the grid electrode g of the second transistor 142 makes the first electrode d and the second electrode s form a channel. The first transistor 141 and the second transistor 142 are complementary transistors, which is represented in the disclosure as follows. If the first transistor 141 and the second transistor 142 are individually controlled by a same time-sequence signal, the first transistor 141 and the second transistor 142 have opposite states. For example, if the time-sequence signal is indicative of controlling the first transistor 141 to be turned on, the time-sequence signal is indicative of controlling the second transistor 142 to be turned off. Alternatively, if the time-sequence signal is indicative of controlling the first transistor 141 to be turned off, the time-sequence signal is indicative of controlling the second transistor 142 to be turned on. The first transistor 141 turned-on or turned-off refers to that the channel formed by the first electrode d of the first transistor 141 and the second electrode s of the first transistor 141 is on or off. Alternatively, the second transistor 142 turned-on or turned-off refers to that the channel formed by the first electrode d of the second transistor 142 and the second electrode s of the second transistor 142 is on or off.

It can be understood that, in the implementation, the first transistor 141 and the second transistor 142 are complementary transistors, such that a same time-sequence signal can be indicative of controlling the driving circuit 12 and the driving control circuit 14 together to output two different data-voltage signals, thereby simplifying a circuit design of the driving circuit 12.

In the implementation, the processor 13 controls the time-sequence controller 143 to generate a corresponding time-sequence signal. The time-sequence signal is indicative of controlling the first transistor 141 to be turned off and control the second transistor 142 to be turned on, such that the ground signal is outputted via the channel formed by the second electrode s of the second transistor 142 and the first electrode d of the second transistor 142.

Specifically, since the first transistor 141 and the second transistor 142 are complementary transistors, the time-sequence signal is indicative of controlling the first transistor 141 to be turned off and also indicative of controlling the second transistor 142 to be turned on, such that the ground signal is outputted via the channel formed by the second electrode s of the second transistor 142 and the first electrode d of the second transistor 142. That is to say, the ground signal as the third data-voltage signal is transmitted to the pixel unit 111 and has a voltage of 0 V, thereby avoiding changing voltages across two ends of the pixel unit 111 and realizing partial refresh of the pixel unit 111.

In a possible implementation, referring to FIG. 4 together, FIG. 4 is a data-voltage-signal Look-Up Table (LUT) provided in an implementation of the disclosure. The processor 13 is configured to establish a data-voltage-signal LUT according to comparison results. The data-voltage-signal LUT contains a comparison result between one of the multiple first data-voltage signals and one of the multiple second data-voltage signals that both are to be received by each of the multiple pixel units 111. The processor 13 is configured to control, according to the data-voltage-signal LUT, the driving circuit 12 to drive the multiple pixel units 111 to work.

It is to be noted that, generally, the pixel units 111 on the display screen 11 are arranged in an array. Taking the electrophoretic display device 1 provided in the disclosure as an example for illustration, the number of the pixel units 111 is n*11, where n is a positive integer greater than or equal to 4. It can be understood that, in other possible implementations, an arrangement form and the number of the pixel units 111 are not limited in the disclosure.

Specifically, as illustrated in FIG. 4, a table in a form of array represents the pixel units 111 that are arranged in an array, where each cell corresponds to a pixel unit 111. In the implementation, sequence number "0" represents that the comparison result represents that the first data-voltage signal and the second data-voltage signal are the same, and the processor 13 controls the driving circuit 12 and the driving control circuit 14 to output a 0 V data-voltage signal to the pixel unit 111. Sequence number "1" represents that the comparison result represents that the first data-voltage signal and the second data-voltage signal are different, and the processor 13 controls the driving circuit 12 and the driving control circuit 14 to output a data-voltage signal of a negative voltage to the pixel unit 111. Sequence number "2" represents that the comparison result represents that the first data-voltage signal and the second data-voltage signal are different, and the processor 13 controls the driving circuit 12 and the driving control circuit 14 to output a data-voltage signal of a positive voltage to the pixel unit 111.

It can be understood that, in the implementation, the processor 13, according to the data-voltage-signal LUT, directly controls the driving circuit 12 and the driving control circuit 14 to output data-voltage signals, thereby saving a circuit design space of the driving circuit 12 and improving input efficiency of the data-voltage signals.

It can be understood that, in other possible implementations, the processor 13 can further establish different data-voltage-signal LUTs according to comparison results, which is not limited in the disclosure.

In a possible implementation, on condition that the comparison result represents that the first data-voltage signal and the second data-voltage signal that both are to be received by the same pixel unit 111 are different, the processor 13 controls the driving circuit 12 and the driving control circuit 14 to charge the pixel unit 111 with the second data-voltage signal generated.

Specifically, the first data-voltage signal and the second data-voltage signal that both are to be received by the same pixel unit 111 being different refers to that the first data-voltage signal and the second data-voltage signal have different polarities or different values. That is to say, a gray level displayed by the pixel unit 111 at the first time is different from a gray level displayed by the pixel unit 111 at the second time.

It can be understood that, since the first transistor 141 and the second transistor 142 are complementary transistors, the time-sequence signal is indicative of controlling the first transistor 141 to be turned on and also indicative of controlling the second transistor 142 to be turned off, such that the second data-voltage signal is outputted via the channel that is formed by the first electrode d of the first transistor 141 and the second electrode s of the first transistor 141, and transmitted to the pixel unit 111.

It can be understood that, in the implementation, since the first data-voltage signal and the second data-voltage signal are different, the driving circuit 12 directly drives the pixel unit 111 to work according to the second data-voltage signal, thereby displaying an accurate gray level.

Figure 5:
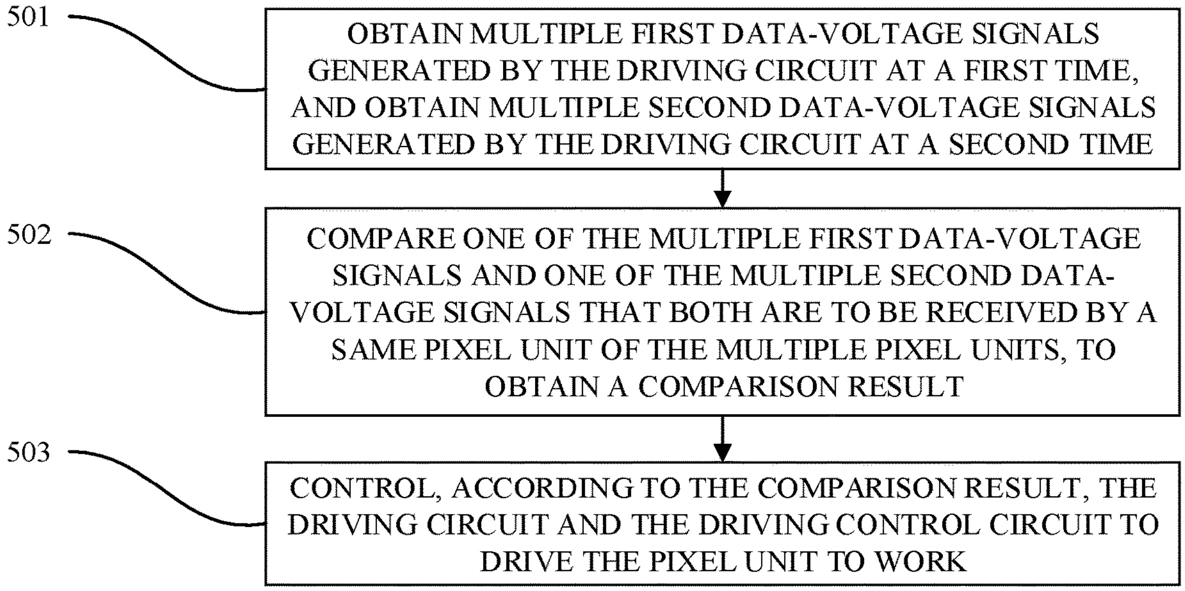
FIG. 5 is a schematic flow chart illustrating a method for electrophoretic display refreshing provided in an implementation of the disclosure.

A method for electrophoretic display refreshing is further provided in the disclosure. The method for electrophoretic display refreshing is applied to the electrophoretic display device 1 mentioned above. Referring to FIG. 5 together, FIG. 5 is a schematic flow chart illustrating a method for electrophoretic display refreshing provided in an implementation of the disclosure. The method for electrophoretic display refreshing includes operations at block 501, block 502, and block 503, and the following will illustrate the operations at block 501, block 502, and block 503 in details.

At block 501, multiple first data-voltage signals generated by the driving circuit are obtained at a first time, and multiple second data-voltage signals generated by the driving circuit are obtained at a second time.

At block 502, one of the multiple first data-voltage signals and one of the multiple second data-voltage signals that both are to be received by a same pixel unit of the multiple pixel units are compared, to obtain a comparison result.

At block 503, the driving circuit and the driving circuit are controlled, according to the comparison result, to drive the pixel unit to work.

Specifically, for the electrophoretic display device 1 and how to control, according to the comparison result, the driving circuit 12 and the driving control circuit 14 to drive the pixel unit 111 to work, reference can be made to the above illustration, which is not repeated herein.

It can be understood that, in the implementation, by obtaining the comparison result through comparing the first data-voltage signal and the second data-voltage signal that both are to be received by the same pixel unit 111 at different times, the processor 13 controls, according to the comparison result, the driving circuit 12 and the driving control circuit 14 to drive the pixel unit 111 to work, thereby realizing partial refresh instead of full-screen refresh, and thus reducing a risk of occurrence of image sticking and reducing power consumption of driving the pixel unit 111.

In a possible implementation, on condition that the comparison result represents that the first data-voltage signal and the second data-voltage signal that both are to be received by the same pixel unit are the same, the driving circuit 12 and the driving control circuit 14 are controlled to generate a third data-voltage signal for charging the pixel unit 111, where a voltage of the third data-voltage signal is 0 V.

Specifically, for a method for controlling the driving circuit 12 to generate the third data-voltage signal for charging the pixel unit 111, reference can be made to the above illustration, which is not repeated herein.

In a possible implementation, the method for electrophoretic display refreshing further includes the following. A data-voltage-signal LUT is established according to comparison results. The driving circuit 12 is controlled, according to the data-voltage-signal LUT, to drive the multiple pixel units 111 to work.

Specifically, for the data-voltage-signal LUT and how to control, according to the data-voltage-signal LUT, the driving circuit 12 to drive the multiple pixel units 111 to work, reference can be made to the above illustration, which is not repeated herein.

In a possible implementation, on condition that the comparison result represents that the first data-voltage signal and the second data-voltage signal that both are to be received by the same pixel unit are different, the driving circuit 12 and the driving control circuit 14 are controlled to charge the pixel unit 111 with the second data-voltage signal generated.

Specifically, for controlling the driving circuit 12 and the driving control circuit 14 to charge the pixel unit 111 with the second data-voltage signal generated, reference can be made to the above illustration, which is not repeated herein.

Principles and implementation manners of the disclosure are elaborated with specific implementations herein. The illustration of implementations above is only used to help understanding of core ideas of the disclosure. At the same time, for those of ordinary skill in the art, according to ideas of the disclosure, there will be changes in the specific implementation manners and application scopes. In summary, contents of this specification should not be understood as limitation on the disclosure.

What is claimed is:

1. An electrophoretic display device, comprising a display screen, a driving circuit, a driving control circuit, and a processor, wherein the processor is directly connected to the driving circuit, the driving circuit is directly connected to the driving control circuit, the driving control circuit is directly connected to the display screen, the display screen comprises a plurality of pixel units, the driving circuit is configured to generate a plurality of first data-voltage signals at a first time and a plurality of second data-voltage signals at a second time, the processor is configured to obtain and compare one of the plurality of first data-voltage signals and one of the plurality of second data-voltage signals that both are to be received by a same pixel unit of the plurality of pixel units, to obtain a comparison result, and the processor is configured to control, according to the comparison result, the driving circuit and the driving control circuit to drive the pixel unit to work;

wherein the driving control circuit comprises a first transistor, a second transistor, and a time-sequence controller, a first electrode of the first transistor is directly electronically connected to an output end of the driving circuit, a second electrode of the first transistor is directly electronically connected to a first electrode of the second transistor, a grid electrode of the first transistor is directly electronically connected to a grid electrode of the second transistor and is configured to receive a time-sequence signal generated by the time-sequence controller, and a second electrode of the second transistor is grounded, wherein the first transistor and the second transistor are complementary transistors.

2. The electrophoretic display device of claim 1, wherein on condition that the comparison result represents that the first data-voltage signal and the second data-voltage signal that both are to be received by the same pixel unit are the same, the processor is configured to control the pixel unit to be grounded through the driving control circuit, wherein a voltage of each of the first data-voltage signal and the second data-voltage signal is not equal to 0 Volt (V).

3. The electrophoretic display device of claim 2, wherein the processor is configured to establish a data-voltage-signal Look-Up Table (LUT) according to comparison results, the data-voltage-signal LUT contains a comparison result between one of the plurality of first data-voltage signals and one of the plurality of second data-voltage signals that both are to be received by each of the plurality of pixel units, and the processor is configured to control, according to the data-voltage-signal LUT, the driving circuit and the driving control circuit to drive the plurality of pixel units to work.

4. The electrophoretic display device of claim 1, wherein the processor is configured to control the time-sequence controller to generate a corresponding time-sequence signal, the time-sequence signal is indicative of controlling the first transistor to be turned off and control the second transistor to be turned on, such that the pixel unit is grounded via a channel formed by the second electrode of the second transistor and the first electrode of the second transistor.

5. The electrophoretic display device of claim 1, wherein on condition that the comparison result represents that the first data-voltage signal and the second data-voltage signal that both are to be received by the same pixel unit are different, the processor is configured to control the driving circuit and the driving control circuit to charge the pixel unit with the second data-voltage signal generated by the driving circuit.

6. The electrophoretic display device of claim 5, wherein the processor is configured to control the time-sequence controller to generate a corresponding time-sequence signal, the time-sequence signal is indicative of controlling the first transistor to be turned on and control the second transistor to be turned off, such that the pixel unit is charged with the second data-voltage signal generated by the driving circuit via a channel formed by the second electrode of the first transistor and the first electrode of the first transistor.

7. A method for electrophoretic display refreshing, applied to an electrophoretic display device comprising a display screen, a driving circuit, a driving control circuit, and a processor, the processor being directly connected to the driving circuit, the driving circuit being directly connected to the driving control circuit, the driving control circuit being directly connected to the display screen, the display screen comprising a plurality of pixel units, the driving circuit being configured to generate a plurality of first data-voltage signals at a first time and a plurality of second data-voltage signals at a second time, the processor being configured to obtain and compare one of the plurality of first data-voltage signals and one of the plurality of second data-voltage signals that both are to be received by a same pixel unit of the plurality of pixel units, to obtain a comparison result, and the processor being configured to control, according to the comparison result, the driving circuit and the driving control circuit to drive the pixel unit to work, the method comprising:

obtaining a plurality of first data-voltage signals generated by the driving circuit at a first time, and obtaining a plurality of second data-voltage signals generated by the driving circuit at a second time;

comparing one of the plurality of first data-voltage signals and one of the plurality of second data-voltage signals that both are to be received by a same pixel unit of the plurality of pixel units, to obtain a comparison result; and controlling, according to the comparison result, the driving circuit and the driving control circuit to drive the pixel unit to work;

wherein the driving control circuit comprises a first transistor, a second transistor, and a time-sequence controller, a first electrode of the first transistor is directly electronically connected to an output end of the driving circuit, a second electrode of the first transistor is directly electronically connected to a first electrode of the second transistor, a grid electrode of the first transistor is directly electronically connected to a grid electrode of the second transistor and is configured to receive a time-sequence signal generated by the time-sequence controller, and a second electrode of the second transistor is grounded, wherein the first transistor and the second transistor are complementary transistors.

8. The method for electrophoretic display refreshing of claim 7, wherein controlling, according to the comparison result, the driving circuit and the driving control circuit to drive the pixel unit to work comprises:

on condition that the comparison result represents that the first data-voltage signal and the second data-voltage signal that both are to be received by the same pixel unit are the same, controlling the driving circuit and the driving control circuit to generate a third data-voltage signal for charging the pixel unit, wherein a voltage of the third data-voltage signal is 0 Volt (V) and a voltage of each of the first data-voltage signal and the second data-voltage signal is greater than or less than a voltage of the third data-voltage signal.

9. The method for electrophoretic display refreshing of claim 7, wherein controlling the driving circuit and the driving control circuit to generate the third data-voltage signal for charging the pixel unit comprises:

controlling the time-sequence controller to generate a corresponding time-sequence signal, the time-sequence signal being indicative of controlling the first transistor to be turned off and control the second transistor to be turned on.

10. The method for electrophoretic display refreshing of claim 7, wherein controlling, according to the comparison result, the driving circuit and the driving control circuit to drive the pixel unit to work comprises:

on condition that the comparison result represents that the first data-voltage signal and the second data-voltage signal that both are to be received by the same pixel unit are different, controlling the driving circuit and the driving control circuit to charge the pixel unit with the second data-voltage signal generated.

11. The method for electrophoretic display refreshing of claim 10, wherein controlling the driving circuit and the driving control circuit to charge the pixel unit with the second data-voltage signal generated comprises:

controlling the time-sequence controller to generate a corresponding time-sequence signal, the time-sequence signal being indicative of controlling the first transistor to be turned on and control the second transistor to be turned off.

12. The method for electrophoretic display refreshing of claim 7, further comprising:

establishing a data-voltage-signal Look-Up Table (LUT) according to comparison results; and controlling, according to the data-voltage-signal LUT, the driving circuit to drive the plurality of pixel units to work.

* * * * *